United States Patent [19]

Saito

[11] Patent Number: 5,781,725
[45] Date of Patent: Jul. 14, 1998

[54] COMPUTER NETWORK SYSTEM HAVING A SMALL OF AMOUNT OF DATA IN A NETWORK

[75] Inventor: Katsumi Saito, Tokyo, Japan

[73] Assignee: NEC Corporation, Tokyo, Japan

[21] Appl. No.: 651,467

[22] Filed: May 23, 1996

[30] Foreign Application Priority Data

May 23, 1995 [JP] Japan ................................. 7-148268

[51] Int. Cl.$^6$ ................................................. G06F 13/14
[52] U.S. Cl. ............... 395/187.01; 395/186; 395/188.01; 395/200.55
[58] Field of Search .......................... 395/186, 187.01, 395/188.01, 200.55; 380/25

[56] References Cited

U.S. PATENT DOCUMENTS

| 5,455,953 | 10/1995 | Russell | 395/739 |
| 5,491,752 | 2/1996 | Kaufman et al. | 380/30 |
| 5,535,276 | 7/1996 | Ganesan | 380/25 |
| 5,617,570 | 4/1997 | Russell et al. | 395/684 |

FOREIGN PATENT DOCUMENTS

| 1-169842 | 11/1989 | Japan . |
| 2-157949 | 6/1990 | Japan . |

OTHER PUBLICATIONS

Laferriere et al., "Authentication and Authorization Techniques in Distributed Systems", Carnahan Conference on Security Technology, IEEE, 1993; pp. 164–170.

Neuman et al., "Kerberos: An Authentication Service for Computer Networks", IEEE Communications Magazine, IEEE, pp. 33–38, Sep. 1994.

Ganesan, "Yakshai Augmenting Kerberos with Public Key Cryptography", Network and Distributed System Security Symposium, pp. 132–143, 1995.

Primary Examiner—Alyssa H. Bowler
Assistant Examiner—Walter D. Davis
Attorney, Agent, or Firm—Ostrolenk, Faber, Gerb & Soffen, LLP

[57] ABSTRACT

In a computer network system having client and server computers (26,27), an access right check requesting section (28) of the client computer supplies a user certification datum to a access right checking section (32) of the server computer. The access right checking section (32) checks a name of a user and a password of the user certification datum with predetermined held names of users and predetermined held passwords to produce and supply a certification result datum to a client certification result holding section (29) of the client computer when the name of the user coincides with the one of predetermined held names of the users and when the password coincides with the one of predetermined held passwords. A process requesting section (30) compares the certification result datum of the client certification result holding section (29) with the user certification datum which is supplied with a process requesting command having the user certification datum. The process requesting section supplies the process requesting command to the server computer when the certification result datum coincides with the user certification datum.

5 Claims, 10 Drawing Sheets

COMPUTER NETWORK SYSTEM HAVING A SMALL OF AMOUNT OF DATA IN A NETWORK

FIELD OF THE INVENTION

The invention relates to a computer network system, and more particularly, to a computer network system having a first computer for requesting a process as a client computer, a second computer for carrying out, as a server computer, the process requested by the first computer, and a network which connects the client and server computers.

BACKGROUND OF THE INVENTION

A first conventional computer network system of the type described is disclosed in Japanese Patent Laid Open Publication (Kokai) No. 157949/1990. In the manner which will later be described more in detail, this conventional computer network system comprises having the client computer for requesting a process, the server computer for carrying out the process requested by the client computer, and the network which connects the client and the server computers. The server computer has a table with check data for checking whether or not a process requesting command is permitted to be processed. Therefore, in this conventional computer network system, the server computer checks whether or not a process requesting command is permitted to be processed, when the server computer is supplied with the process requesting command from the client computer through the network.

A second conventional computer network system of the type described is disclosed in Japanese Utility Model Laid Open Publication (Kokai) No. 169842/1989. The second conventional computer network system is similar to the first conventional computer network system.

However, in the conventional computer network systems, the process requesting command is supplied to the server computer from the client computer through the network, even when the process requesting command is not permitted to be processed. As a result, the conventional computer network systems have a disadvantage in that an amount of data which is transferred in the network is increased.

SUMMARY OF THE INVENTION

Accordingly, it is an object of the invention to provide a computer network system in which an amount of data which is transferred in a network is decreased.

It is another object of the invention to provide a computer network system in which a client computer does not supply a process requesting command which will not be permitted to be processed to a server computer.

Other objects of the invention will become clear as the description proceeds.

According to an aspect of the invention, there is provided a computer network system which comprises a first computer for requesting a process as a client computer, a second computer for carrying out, as a server computer, the process requested by the client computer, and a network which connects the client and server computers, the client computer comprising:

access right check requesting means for requesting a check of an access right to the second computer by supplying a user certification datum having a name of a user, a name of the client computer, a name of the server computer, and a password to the server computer when the access right check requesting means is supplied with the user certification datum; and process requesting means for comparing a certification result datum having the name of the user, the name of the client computer, the name of the server computer, and the password with the user certification datum when the process requesting means is supplied with a process requesting command having the user certification datum and when the process requesting means is supplied with the certification result datum from the server computer, the process requesting means being for supplying the process requesting command to the server computer when the certification result datum coincides with the user certification datum;

the server computer comprising access right checking means for checking the name of the user and the password of the user certification datum from the client computer with predetermined held names of users and predetermined held passwords to produce and supply the certification result datum to the client computer when the name of the user coincides with one of predetermined held names of the user and when the password coincides with one of predetermined held passwords.

According to another aspect of the invention, there is provided a computer network system which comprises a first computer for requesting a process as a client computer, a second computer for carrying out, as a server computer, the process requested by the client computer, and a network which connects the client and server computers, the client computer comprising:

access right check requesting means for requesting a check of an access right to the server computer by supplying a user certification datum having a name of a user, a name of the client computer, a name of the server computer, and a password to the server computer when the access right check requesting means is supplied with the user certification datum;

certification result holding means for holding a certification result datum having the name of the user, the name of the client computer, the name of the server computer, and the password as a held certification result datum having a held name of the user, a held name of the client computer, a held name of the server computer, and a held password when the certification result holding means is supplied with the certification result datum from the server computer; and process requesting means for comparing the held certification result datum with the user certification datum when the process requesting means is supplied with a process requesting command having the user certification datum and when the process requesting means is supplied with the held certification result datum from the certification result holding means, the process requesting means being for supplying the process requesting command to the server computer when the held certification result datum coincides with the user certification datum;

the server computer comprising access right checking means for checking the name of the user and the password of the user certification datum from the client computer with predetermined held names of users and predetermined held passwords to produce and supply the certification result datum to the client computer when the name of the user coincides with one of predetermined held names of the users and when the password coincides with one of predetermined held passwords.

According to a further aspect of the invention, there is provided a computer network system which comprises a first computer for requesting a process as a client computer, a second computer for carrying out, as a server computer, the process requested by the client computer, and a network which connects the client and server computers, the client computer comprising:

access right check requesting means for requesting a check of an access right to the server computer by supplying a user certification datum having a name of a user, a name of the client computer, a name of the server computer, and a password to the server computer when the access right check requesting means is supplied with the user certification datum;

client certification result holding means for holding a certification result datum having the name of the user, the name of the client computer, the name of the server computer, and the password as a client held certification result datum having a client held name of the user, a client held name of the client computer, a client held name of the server computer, and a client held password when the client certification result holding means is supplied with the certification result datum from the server computer;

process requesting means for comparing the client held certification result datum with the user certification datum when the process requesting means is supplied with a process requesting command having the user certification datum and when the process requesting means is supplied with the client held certification result datum from the client certification result holding means, the process requesting means being for supplying the process requesting command to the server computer when the held certification result datum coincides with the user certification datum; and client erasing means for erasing the client held certification result datum of the client certification result holding means when the erasing means is supplied with a process end requesting command;

the server computer comprising:

access right checking means for checking the name of the of the user and the password of the user certification datum from the client computer with predetermined held names of users and predetermined held passwords to produce and supply the certification result datum to the client computer when the name of the user coincides with one of predetermined held names of the users and when the password coincides with one of predetermined held passwords; and process carrying out means for carrying out a process requested by the process requesting command when the process carrying out means is supplied with the process requesting command from the process requesting means.

BRIEF DESCRIPTION OF DRAWINGS

The invention will be explained in more detail in conjunction with appended drawings, wherein.

DESCRIPTION OF THE PREFERRED EMBODIMENT

Before explaining a computer network system in the embodiment according to the invention, the aforementioned conventional computer network system will be explained in FIG. 1.

Figure 1:
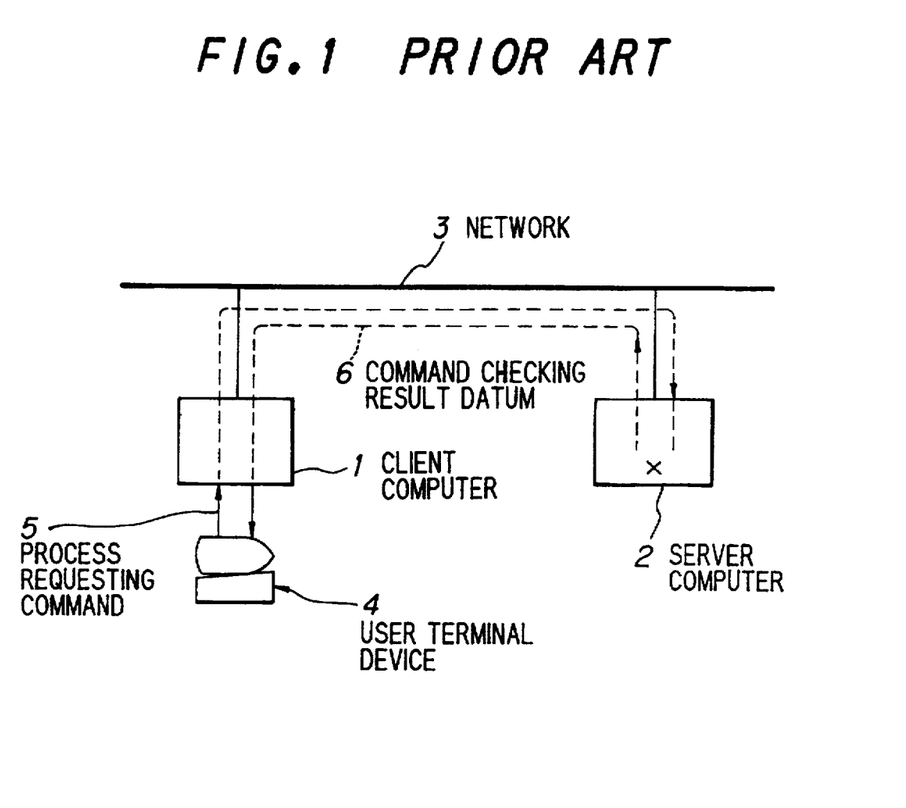
FIG. 1 is a view for use in describing operation of a conventional computer network system.

FIG. 1 shows the conventional computer network system which comprises a first computer i for requesting a process as a client computer, a second computer 2 for carrying out, as a server computer, the process requested by the client computer 1, and a network which connects the client and server computers 1 and 2.

The client computer 1 comprises a user terminal device 4. When the client computer 1 is supplied with a process requesting command 5 to the server computer 2. The server computer 2 has a table with check data for checking whether or not a process requesting command 5 is permitted to be processed when the server computer 2 is supplied with the process requesting command 5 from the client computer 1 through the network 3. When the server computer 2 checks whether or not the process requesting command 5 is permitted to be processed, the server computer 2 produces a command checking result datum 6 representing whether or not the process requesting command 5 is permitted to be processed.

However, the process requesting command 5 is supplied to the server computer 2 from the client computer 1 through the network 3 even when the process requesting command is not permitted to be processed. Namely, the client computer 1 supplies the process requesting command through the network 3 to the server computer 2 even when the process requesting command is not permitted to be processed. As a result, the conventional computer network system has a large amount of data which is transferred in the network 3.

According to the invention, there is provided a computer network system in which a client computer does not supply a process requesting command through a network the server computer when the process requesting command is not permitted to be processed.

Figure 2:
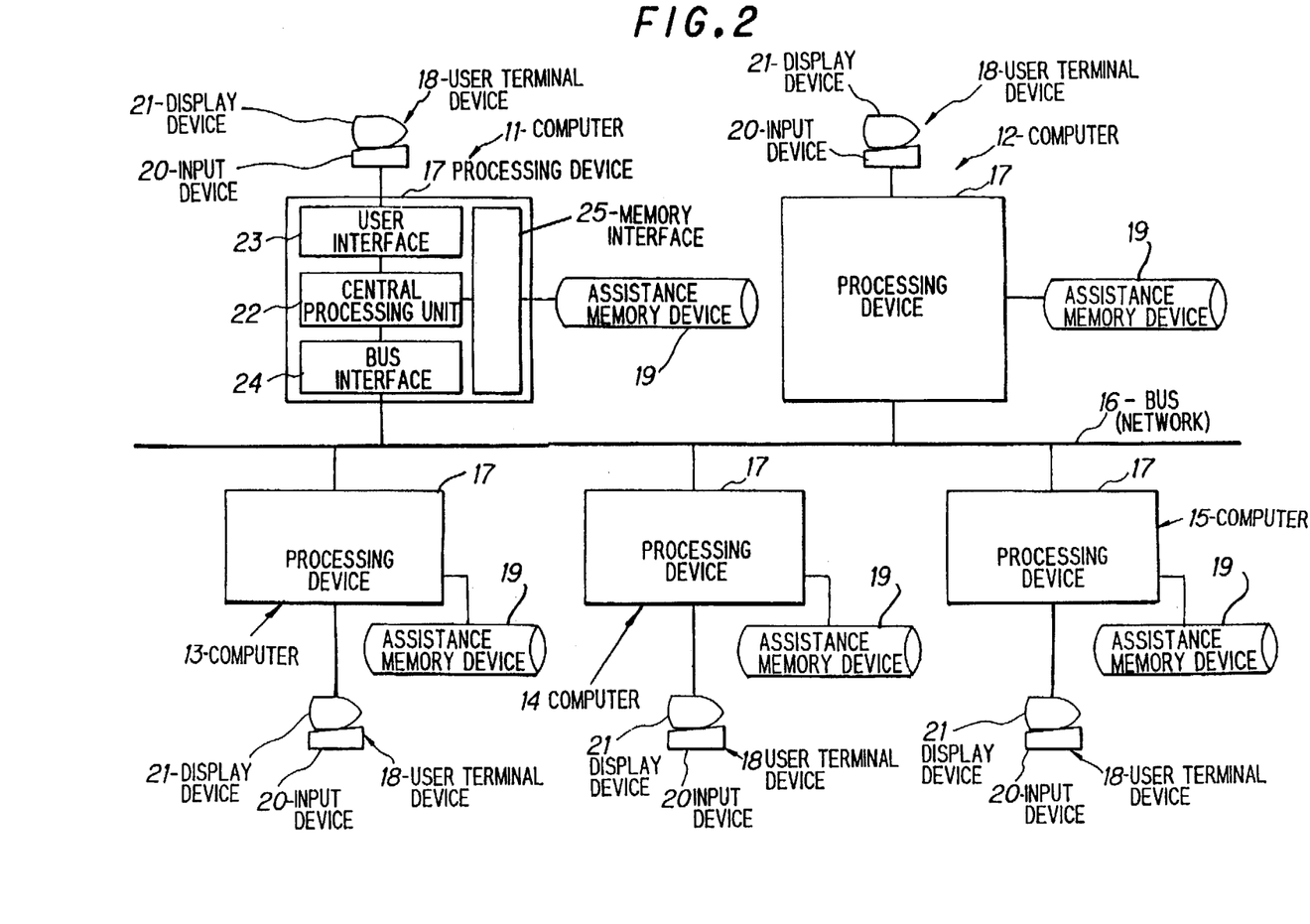
FIG. 2 a block diagram of a computer network system according to an embodiment of the invention.

Referring to FIG. 2, the description will proceed to a computer network system in an embodiment according to the invention.

The computer network system comprises a plurality of computers 11, 12, 13, 14, and 15 and a bus (network) 16 which connects the computers 11 to 15. Each of the computers 11 to 15 comprises a processing device 17, a user terminal device 18, and an assistance memory device 19 such as a magnetic disk device. The user terminal device 18 comprises an input device 20 and a display device 21. The processing device 17 comprises a central processing unit 22, a user interface 23, a bus interface 24, and a memory interface 25. The user interface 23 is connected between the central processing unit 22 and the user terminal device 18. The bus interface 24 is connected between the central processing unit 22 and the bus 16. The memory interface 25 is connected between the central processing unit 22 and the assistance memory device 19.

The computers 11 to 15 transfer data and commands to each other through the bus 16 by softwares which are operated in the central processing units 22. Each of the computers 11 to 15 can operate as a client computer or a server computer. Hereinafter one of the computers 11 to 15 is called the client computer and another of the computers 11 to 15 is called the server computer.

Figure 3:
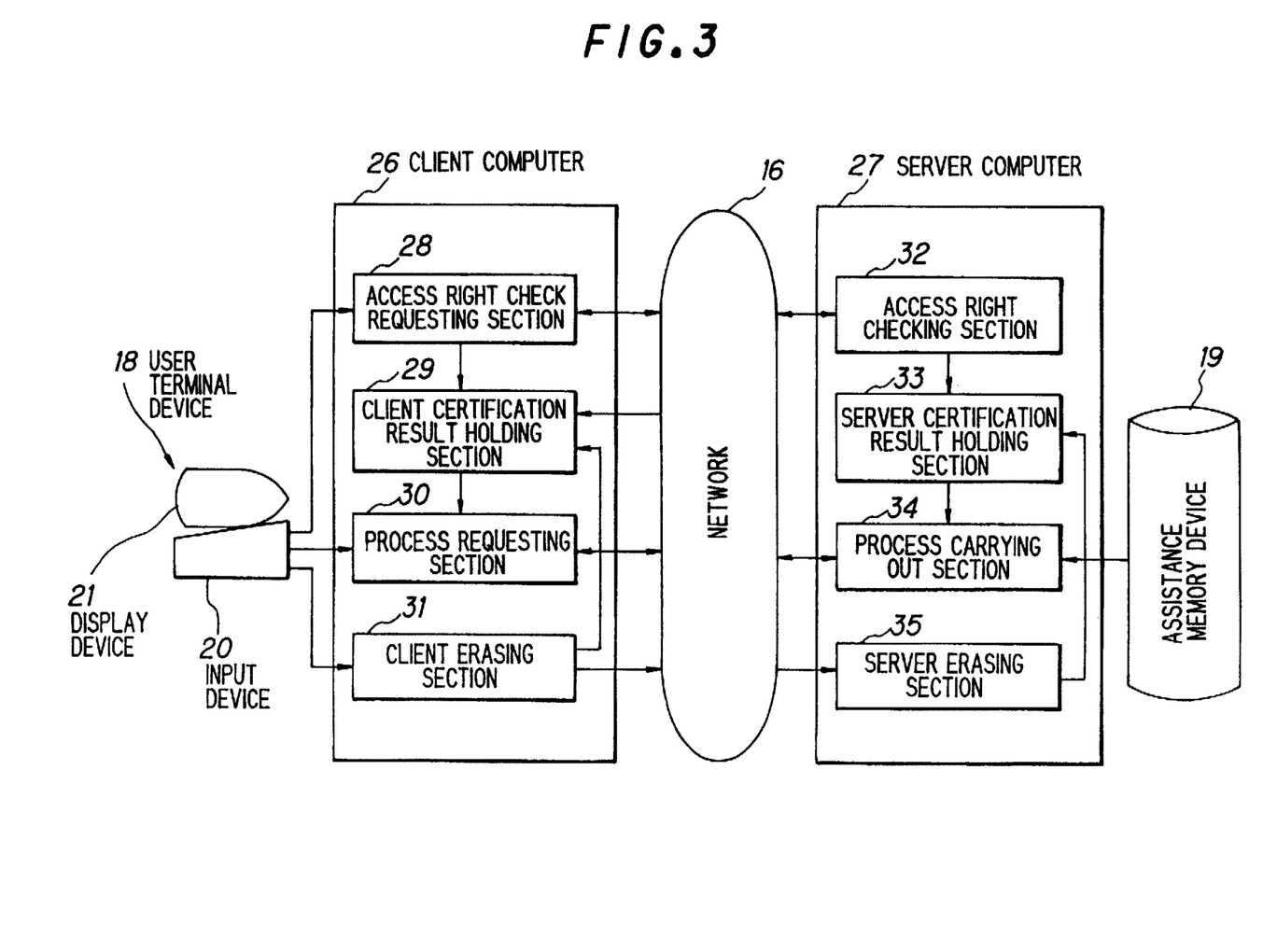
FIG. 3 a block diagram of a client computer and a server computer of the computer network system illustrated in FIG. 2.

Referring to FIG. 3, the description will proceed to the client computer and the server computer of the computer network system illustrated in FIG. 2.

In FIG. 3, the client computer 26 is connected to the server computer 27 through the network 16. The client computer 26 comprises an access right check requesting section 28, a client certification result holding section 29, a process requesting section 30, and a client erasing section 31. The server computer 27 comprises an access right checking section 32, a server certification result holding section 33, a process carrying out section 34, and a server erasing section 35.

The access right check requesting section 28, the process requesting section 30, and the client erasing section 31 are implemented by a software of the client computer 26. The client certification result holding section 29 is implemented by a portion of a main memory device (not shown) or the assistance memory device 19.

The access right checking section 32, the process carrying out section 34, and the server erasing section 35 are implemented by a software of the server computer 27. The server certification result holding section 33 is implemented by a portion of a main memory device (not shown) or the assistance memory device 19.

Figure 4:
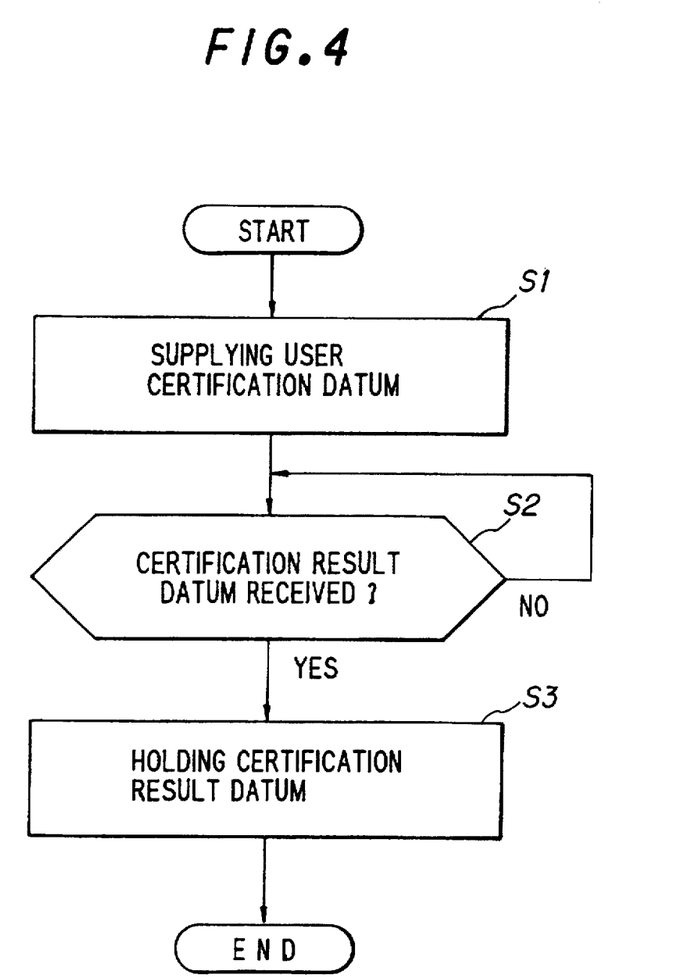
FIG. 4 is a flow chart for use in describing operation of an access right check requesting section and a client certification result holding section in the computer network system illustrated in FIGS. 2 and 3.

Referring to FIG. 4, the description will proceed to the access right requesting section 28 and the client certification result holding section 29 of the computer network system illustrated in FIGS. 2 and 3.

In FIG. 4, at a step S1, the access right requesting section 28 requests a check of an access right to the server computer 27 by supplying a user certification datum to the server computer 27 when the access right requesting section 28 is supplied with the user certification datum from the input device 20 which is operated by a user. The user certification datum has a name of a user, a name of the client computer 26, a name of the server computer 27, and a password.

At a step S2, the client certification result holding section 29 checks whether or not receives a certification result datum from the server computer 27. The certification result datum has the name of the user, the name of the client computer 26, the name of the server computer 27, the password, and a carrying out lag. The carrying out flag represents whether or not the server computer 27 can carry out a process requested by a process requesting command.

The carrying out flag has "1" when the server computer 27 can carry out a process requested by a process requesting command. The carrying out flag has "0" when the server computer 27 can not carry out a process requested by a process requesting command.

At the step S2, the client certification result holding section 29 receives a certification result datum, the step S2 is followed by a step S3. Otherwise, the step S2 is repeated again. At the step S3, the client certification result holding section 29 holds the certification result datum as a held certification result datum having a client held name of the user, a client held name of the client computer 26, a client held name of the server computer 27, a client held password, and a held carrying out flag.

Figure 5:
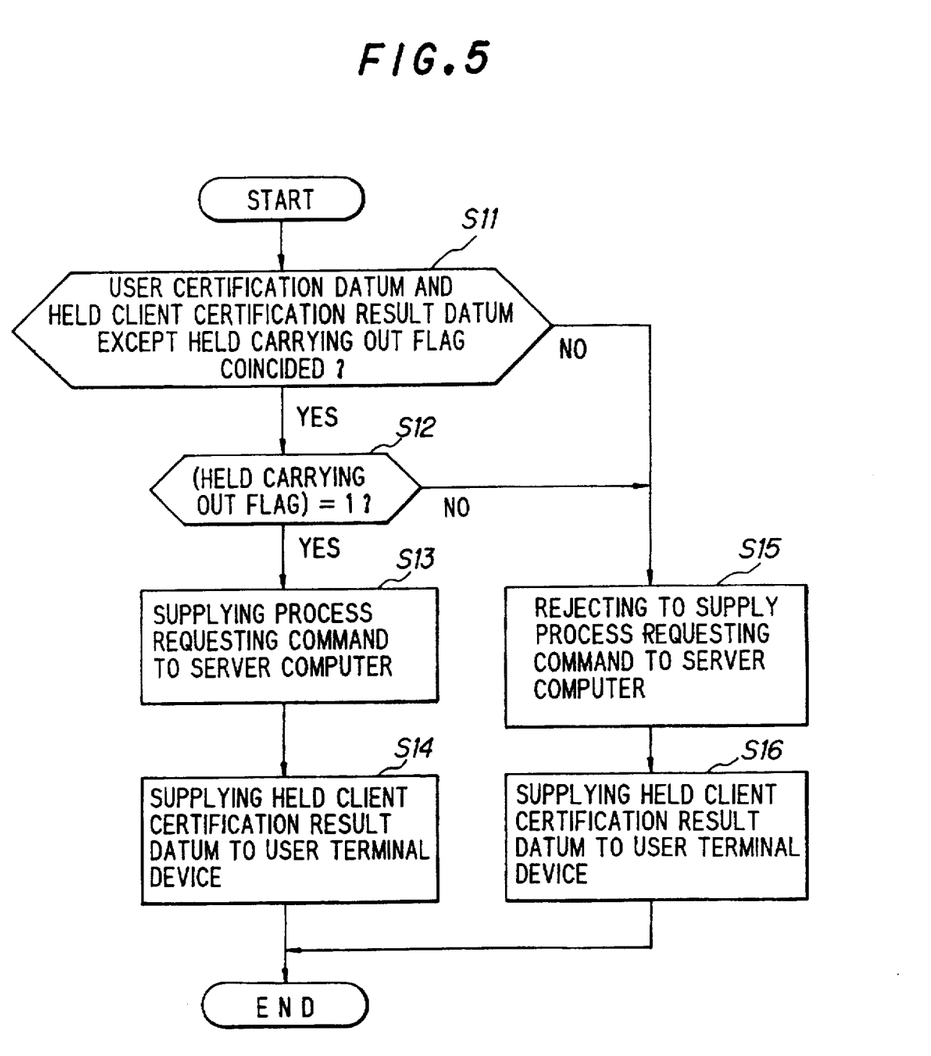
FIG. 5 is a flow chart for use in describing operation of a process requesting section in the computer network system illustrated in FIGS. 2 and 3.

Referring to FIG. 5, the description will proceed to the process requesting section 30 of the computer network system illustrated in FIGS. 2 and 3.

At the step S11, the process requesting section 30 checks whether or not the user certification datum and the client held certification result datum except the held carrying out flag are coincided. That is , the process requesting section 30 compares the user certification datum with the client held certification result datum except the held carrying out flag when the process requesting section 30 is supplied with a process requesting command having the user certification datum from the user terminal device 18 and when the process requesting section is supplied with the client held certification result datum from the client certification result holding section 29.

At the step S11, when the user certification datum coincides with the client held certification result datum except the held carrying out flag, the step S11 is followed by a step S12. Otherwise, the step S11 is followed by a step S15. At the step S12, the process requesting section 30 checks whether or not the held carrying out flag has "1". At the step S12, when the held carrying out flag has "1", the step S12 is followed by a step S13. At the step S13, the process requesting section 30 supplies a process requesting command to the server computer 27. The process requesting command represents a request of the process which is operated by the server computer 27. Next, at a step S14, the process requesting section 30 supplies the client held certification result datum to the user terminal device 18.

At the step S12, when the held carrying g out flag has not "1", the step S12 is followed by the step S15. At the step S15, the process requesting section 30 rejects to supply the process requesting command to the server computer 27. Next, at a step S16, the process requesting section 30 supplies the client held certification result datum to the user terminal device 18.

Figure 6:
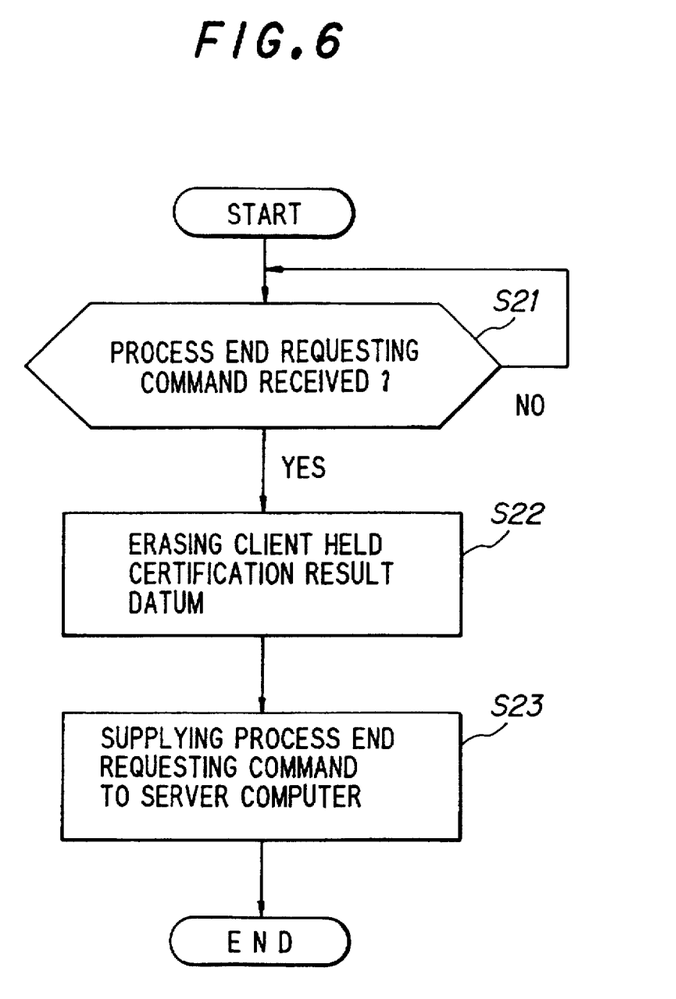
FIG. 6 is a flow chart for use in describing operation of a client erasing section in the computer network system illustrated in FIGS. 2 and 3.

Referring to FIG. 6, the description will proceed to the client erasing section 31 of the computer network system illustrated in FIGS. 2 and 3.

At a step S21, the client erasing section 31 checks whether or not receives a process end requesting command from the user terminal device 18. The process end requesting command represents an end of the process. At the step S21, when the client erasing section 31 receives a process end requesting command, the step S21 is followed by a step S22. Otherwise, the step S21 is repeated again. At the step S22, the client erasing section 31 erases the client held certification result datum of the client certification result holding section 29. Next, the client erasing section 31 supplies the process end requesting command to the server computer 27.

Figure 7:
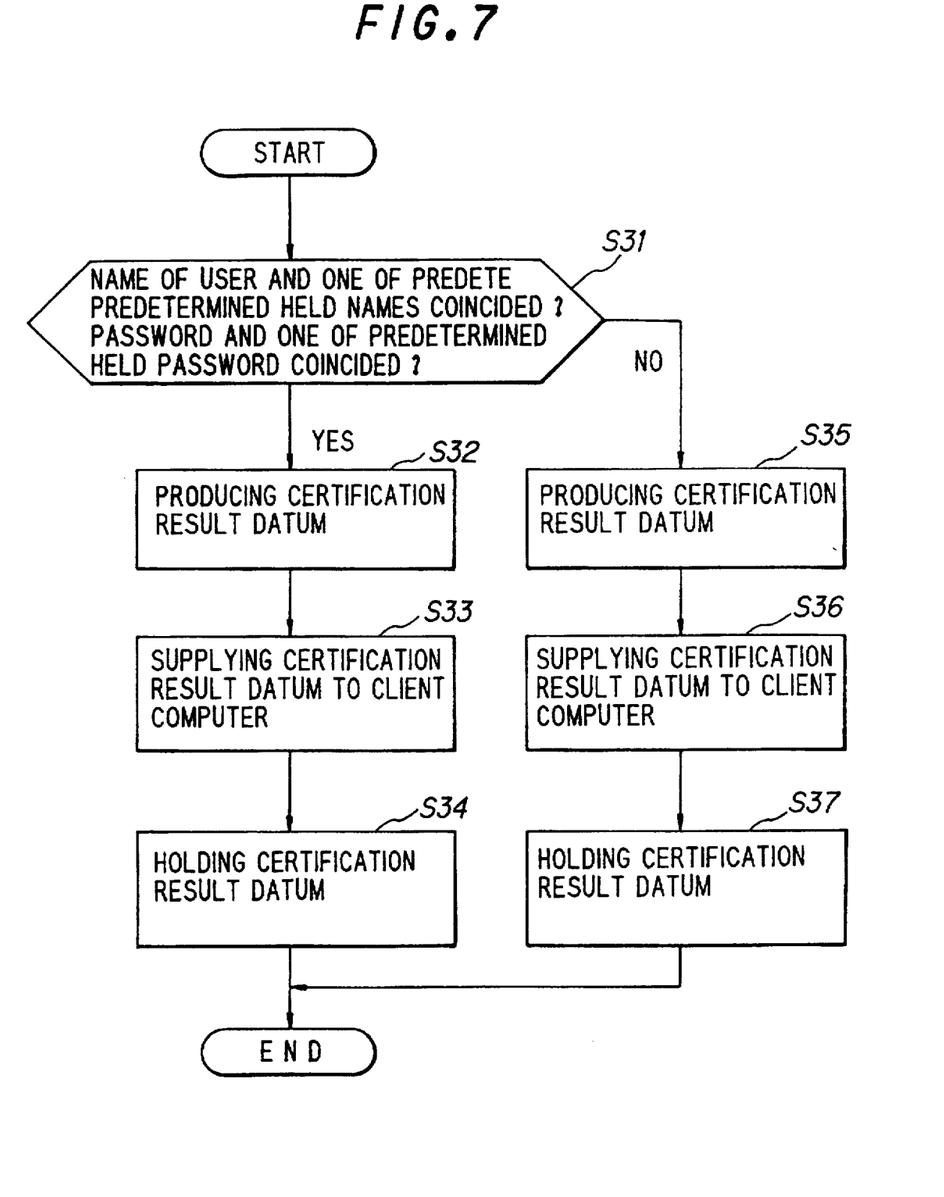
FIG. 7 is a flow chart for use in describing operation of an access right checking section and a server certification result holding section in the computer network system illustrated in FIGS. 2 and 3.

Referring to FIG. 7, the description will proceed to the access right checking section 32 and the server certification result holding section 33 of the computer network system illustrated in FIGS. 2 and 3.

At a step 31, the access right checking section 32 checks whether or not the name of the user coincides with one of predetermined held names of the users and whether or not the password coincides with one of predetermined held passwords. That is, the access right checking section 32 checks the name of the of the user and the password of the user certification datum from the client computer 26 with predetermined held names of users and predetermined held passwords. The predetermined held names of users and the predetermined held passwords are held in the server computer 27.

At a step 31, when the name of the user coincides with one of the predetermined held names of the users and when the password coincides with one of the predetermined held passwords, the step S31 is followed by a step S32. Otherwise, the step S31 is followed by a step S35. At the step S32, the access right checking section 32 produces the certification result datum in which the carry out flag has "1". Next, at a step S33, the access right checking section 32 supplies the certification result datum to the client computer 26. Next, at a step S34, the server certification result holding section 32 holds the certification result datum as a server held certification result datum having a server held name of the user, a server held name of the client computer, a server held name of the server computer, a server held password and a held carry out flag when the server certification result holding section 33 is supplied with the certification result datum from the access right checking section 32.

In the step S35, the access right checking section 32 produces the certification result datum in which the carry out flag has "0". Next, at a step S36, the access right checking section 32 supplies the certification result datum to the client computer 26. Next, at a step S37, the server certification result holding section holds the certification result datum as the server held certification result datum.

Figure 8:
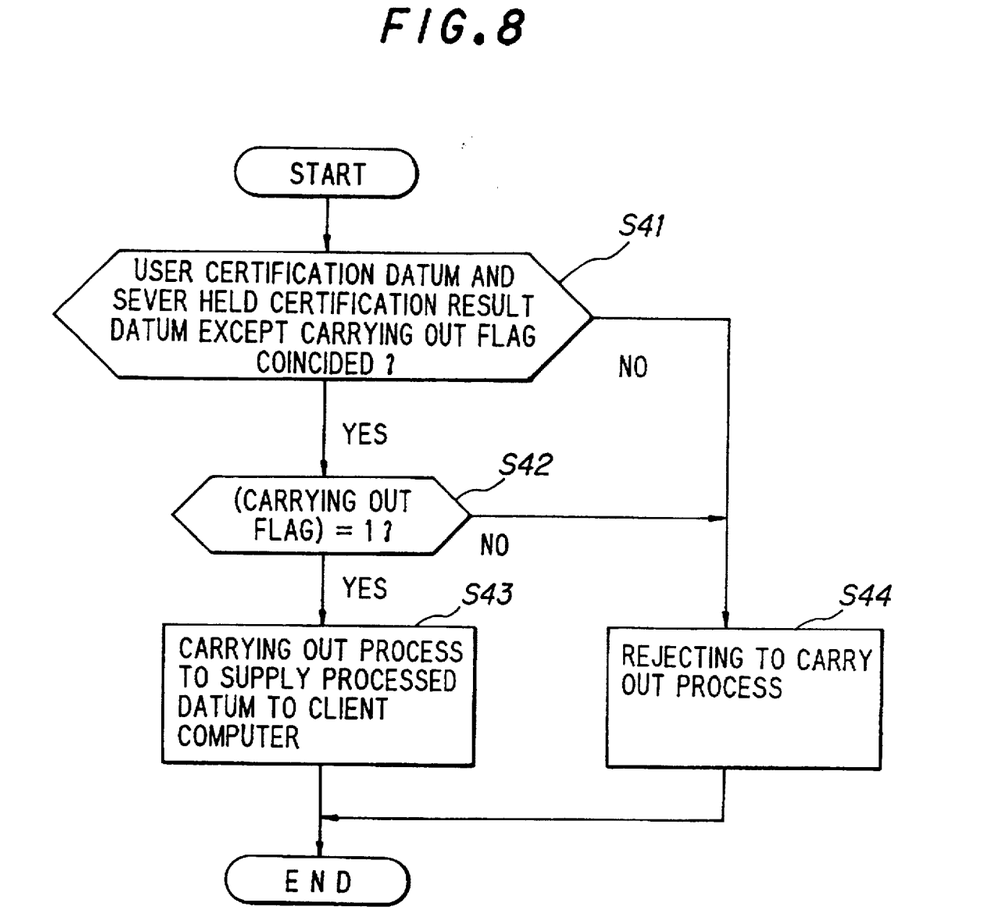
FIG. 8 is a flow chart for use in describing operation of a process carrying out section in the computer network system illustrated in FIGS. 2 and 3.

Referring to FIG. 8, the description will proceed to the process carrying out section 34 of the computer network system illustrated in FIGS. 2 and 3.

At a step S41, the process carrying out section 34 checks whether or not the user certification datum of the process requesting command and the server held certification result datum except the carrying out flag are coincided. That is, the process carrying out section 34 compares the user certification datum of the process requesting command from the process requesting section 30 with the server held certification result datum except the carrying out flag when the process carrying out section 34 is supplied with the held certification result datum from the server certification result holding section 33 and when the process carrying out section 34 is supplied with the process requesting command from the process requesting section 30.

At a step S41, when the user certification datum of the process requesting command and the server held certification result datum except the carrying out flag are coincided, the step S41 is followed by a step S42. Otherwise, the step S41 is followed by a step S44. At the step S42, the process carrying out section 34 checks whether or not the carrying out flag has "1". When the carrying out flag has "1", the step S42 is followed by a step S43. Otherwise, the step S42 is followed by the step S44.

At a step S43, the process carrying out section 34 carries out the process requested by the process requesting command to supply a processed datum to the client computer 26. At the step S44, the process carrying out section 34 rejects to carry out the process requested by the process requesting command.

The server held certification result datum may have no the carrying out flag. In this event, the process carrying out section 34 may comprise a comparing section (not shown) and a carrying out section (not shown). The comparing section compares the user certification datum of the process requesting command from the process requesting section 30 with the server held certification result datum when the process carrying out section 34 is supplied with the held certification result datum from the server certification result holding section 33 and when the process carrying out section 34 is supplied with the process requesting command from the process requesting section 30. The comparing section produces a server certification coincidence signal when the user certification datum coincides with the server held certification result datum. The carrying out section carries out the process requested by the process requesting command when the carrying out section is supplied with the process requesting command from the process requesting section and the server certification coincidence signal from the comparing section.

Figure 9:
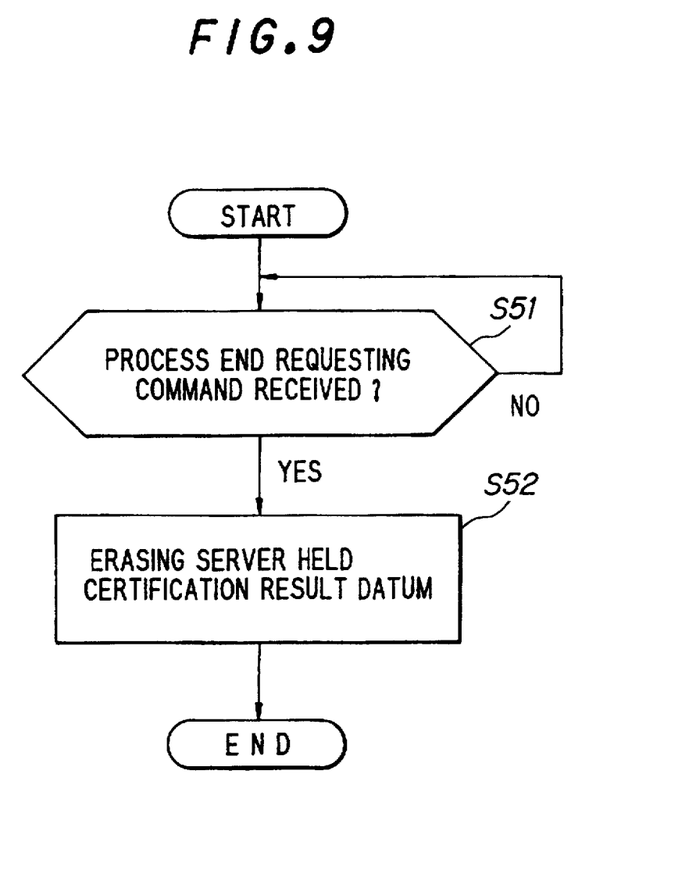
FIG. 9 is a flow chart for use in describing operation of a server erasing section in the computer network system illustrated in FIGS. 2 and 3.

Referring to FIG. 9, the description will proceed to the server erasing section 35 of the computer network system illustrated in FIGS. 2 and 3.

At a step S51, the server erasing section 35 checks whether or not receives the process end requesting command from the client erasing section 31. When the server erasing section 35 receives the process end requesting command, the step S51 is followed by a step S52. Otherwise, the step S51 is repeated again. At the step S52, the server erasing section 35 erases the held certification result datum of the server certification result holding section 33.

Figure 10:
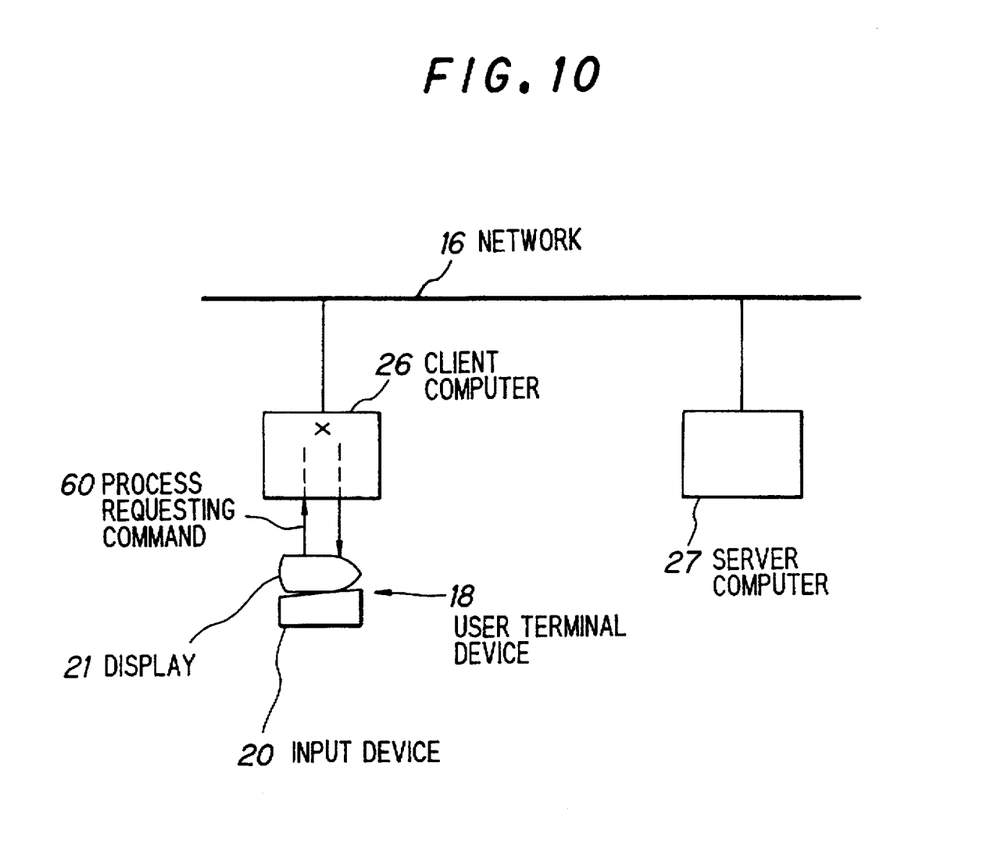
FIG. 10 is a view for use in describing a portion of operation of the computer network system illustrated in FIGS. 2 and 3.

Referring to FIG. 10, the description will proceed to the a portion of the operation of the computer network system illustrated in FIGS. 2 and 3.

As shown in FIG. 10, the client computer 26 does not supply the process requesting command 60 through the network 16 to the server computer 26 when the process requesting command 60 is not permitted to be processed by the server computer 26. As a result, the computer network system of the invention has a small amount of data which is transferred in the network 16.

While the invention has far been described in conjunction with only an embodiment thereof, it will readily be possible for skilled in the art to put the invention into practice in various other manners. For example, the client and the server certification result holding sections 29 and 33 may be omitted. The client and the server erasing sections 31 and 35 may be omitted. The client and the server held certification result data may have no the carrying out flag.

What is claimed is:

1. A computer network system which comprises a first computer for requesting a process as a client computer, a second computer for carrying out, as a server computer, said process requested by said client computer, and a network which connects said client and server computers, said client computer comprising:

access right check requesting means for requesting a check of an access right to said second computer by supplying a user certification datum having a name of a user, a name of said client computer, a name of said server computer, and a password to said server computer when said access right check requesting means is supplied with said user certification datum; and process requesting means for comparing a certification result datum having said name of said user, said name of said client computer, said name of said server computer, and said password with said user certification datum when said process requesting means is supplied with a process requesting command having said user certification datum and when said process requesting means is supplied with said certification result datum from said server computer, said process requesting means being for supplying said process requesting command to said server computer when said certification result datum coincides with said user certification datum;

said server computer comprising access right checking means for checking said name of said user and said password of said user certification datum from said client computer with predetermined held names of users and predetermined held passwords to produce and supply said certification result datum to said client computer when said name of said user coincides with one of predetermined held names of said users and when said password coincides with one of predetermined held passwords.

2. A computer network system which comprises a first computer for requesting a process as a client computer, a second computer for carrying out, as a server computer, said process requested by said client computer, and a network which connects said client and server computers, said client computer comprising:

access right check requesting means for requesting a check of an access right to said server computer by supplying a user certification datum having a name of a user, a name of said client computer, a name of said server computer, and a password to said server computer when said access right check requesting means is supplied with said user certification datum;

certification result holding means for holding a certification result datum having said name of said user, said name of said client computer, said name of said server computer, and said password as a held certification result datum having a held name of said user, a held name of said client computer, a held name of said server computer,and a held password when said certification result holding means is supplied with said certification result datum from said server computer; and process requesting means for comparing said held certification result datum with said user certification datum when said process requesting means is supplied with a process requesting command having said user certification datum and when said process requesting means is supplied with said held certification result datum from said certification result holding means, said process requesting means being for supplying said process requesting command to said server computer when said held certification result datum coincides with said user certification datum;

said server computer comprising access right checking means for checking said name of said user and said password of said user certification datum from said client computer with predetermined held names of users and predetermined held passwords to produce and supply said certification result datum to said client computer when said name of said user coincides with one of predetermined held names of said users and when said password coincides with one of predetermined held passwords.

3. A computer network system as claimed in claim 2, wherein said client computer comprises further erasing means for erasing said held certification result datum of said certification result holding means when said erasing means is supplied with a process end requesting command.

4. A computer network system which comprises a first computer for requesting a process as a client computer, a second computer for carrying out, as a server computer, said process requested by said client computer, and a network which connects said client and server computers, said client computer comprising:

access right check requesting means for requesting a check of an access right to said server computer by supplying a user certification datum having a name of a user, a name of said client computer, a name of said server computer, and a password to said server computer when said access right check requesting means is supplied with said user certification datum;

client certification result holding means for holding a certification result datum having said name of said user, said name of said client computer, said name of said server computer, and said password as a client held certification result datum having a client held name of said user, a client held name of said client computer, a client held name of said server computer, and a client held password when said client certification result holding means is supplied with said certification result datum from said server computer;

process requesting means for comparing said client held certification result datum with said user certification datum when said process requesting means is supplied with a process requesting command having said user certification datum and when said process requesting means is supplied with said client held certification result datum from said client certification result holding means, said process requesting means being for supplying said process requesting command to said server computer when said held certification result datum coincides with said user certification datum; and client erasing means for erasing said client held certification result datum of said client certification result holding means when said erasing means is supplied with a process end requesting command;

said server computer comprising:

access right checking means for checking said name of said user and said password of said user certification datum from said client computer with predetermined held names of users and predetermined held passwords to produce and supply said certification result datum to said client computer when said name of said user coincides with one of predetermined held names of said users and when said password coincides with one of predetermined held passwords; and process carrying out means for carrying out a process requested by said process requesting command when said process carrying out means is supplied with said process requesting command from said process requesting means.

5. A computer network system as claimed in claim 4, wherein said server computer further comprises:

server certification result holding means for holding said certification result datum as a server held certification result datum having a server held name of said user, a server held name of said client computer, a server held name of said server computer, and a server held password when said server certification result holding means is supplied with said certification result datum from said access right checking means; and server erasing means for erasing said server held certification result datum of said server certification result holding means when said server erasing means is supplied with said process end requesting command from said client computer;

said process carrying out means comprising:

comparing means for comparing said server held certification result datum with said user certification datum of said process requesting command when said comparing means is supplied with said held certification result datum from said server certification result holding means and when said comparing means is supplied with said process requesting command from said process requesting means, said comparing means being for producing a server certification coincidence signal when said server held certification result datum coincides with said user certificate ion datum; and carrying out means for carrying out said process requested by said process requesting command when said carrying out means is supplied with said process requesting command from said process requesting means and said server certification coincidence signal from said comparing means.

* * * * *